United States Patent [19]
Johnstone et al.

[11] 3,749,114
[45] July 31, 1973

[54] TWO WAY PULP STOCK VALVE

[76] Inventors: Robert F. Johnstone, 601 Church St., Beaconsfield 870; Kodandraman Balasubramanian, 104 Woodlawn Dr., Dollard des Ormeaux, Quebec, both of Canada

[22] Filed: Nov. 26, 1971

[21] Appl. No.: 202,094

[52] U.S. Cl. ................. 137/244, 251/327, 251/329
[51] Int. Cl. ........................ F16k 3/314, F16k 27/04
[58] Field of Search .................... 251/327, 329, 326; 137/244

[56] References Cited
UNITED STATES PATENTS

| | | | |
|---|---|---|---|
| 2,942,841 | 6/1960 | Stillwagon | 251/326 X |
| 2,911,188 | 11/1959 | Anderson | 251/327 |
| 3,000,608 | 9/1961 | Williams | 251/329 X |
| 3,160,389 | 12/1964 | Schmitz | 251/327 |

FOREIGN PATENTS OR APPLICATIONS

| | | | |
|---|---|---|---|
| 698,615 | 6/1962 | Great Britain | 251/327 |

*Primary Examiner*—Arnold Rosenthal
*Attorney*—George S. Schwind

[57] ABSTRACT

A gate valve comprising a valve body having inlet and outlet portions with curved walls of circular cross-section defining a flow passage, a gate blade slot between said inlet and outlet portions, a pair of annular seat members formed integrally with the walls of the flow passage and defining a gate blade receiving pocket therebetween, a gate blade having a semicircular end projecting through the slot having a groove of V-shaped cross-section in the peripheral edge face thereof, the blade being encapsulated in a layer of resilient material whereby during closing the resilient blade coating is pressed into leak tight engagement with both seat members, and, the V-shaped groove edges scrape the seat members clean, while build-up of pulp in the pocket is prevented.

2 Claims, 4 Drawing Figures

FIG. 3
FIG. 4
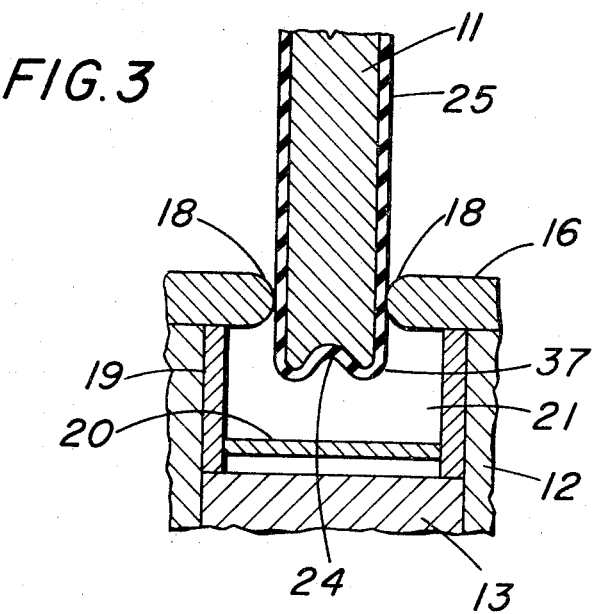
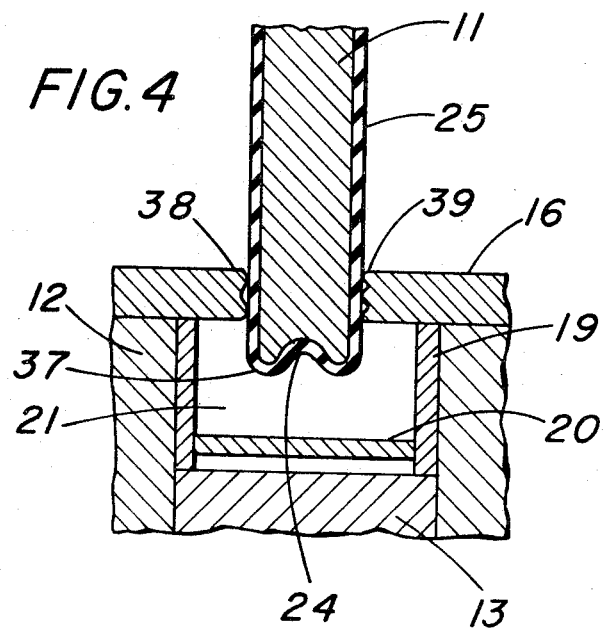

TWO WAY PULP STOCK VALVE

This invention relates to gate valves and particularly to gate valves for handling pulp stock.

A great variety of different gate valves have been designed for the handling of pulp and paper stock and one such valve is that described in Williams U.S. Pat. No. 3,000,608 issued Sept. 19, 1961. That patent discloses a valve which includes a gate blade slidable between a pair of rubber seat members to form a water-tight seal. While this valve is very well suited for handling paper stocks of low or medium concentrations, it is not well suited for stock of high concentration because there is a tendency for the gate blade to push or force fibers between the seat members into the chamber or space therebetween so that the valve body must frequently be flushed in order to prevent excess build-up of fibers within the space. Various other patents describe attempts to avoid this difficulty but in doing so provide a seal in one direction only. This is accomplished by providing wedging devices for forcing the gate into contact with the seat.

Other patents, such as Schmidtz U. S. Pat. No. 3,160,389, issued Dec. 8, 1964, describe valves in which the gate is covered by a resilient layer but all of these designs also have difficulties in handling stocks of high concentration because fiber particles in the stock become trapped between the gate and the valve seats.

It is the principal object of the present invention to provide a gate valve of simple design which will handle concentrated stocks being pumped in either direction through the valve without build-up of fibers at the valve seats.

The gate valve of the present invention is of the usual type having a valve body with inlet and outlet portions with curved walls of circular cross-section defining a flow passage, a gate blade slot between the inlet and outlet portions and a gate blade having a semi-circular end projecting through the slot which engages the seat members within the valve body. It is different from the usual gate valve of the prior art in that a pair of annular seat members are formed integrally with the walls of the flow passage to define a gate blade receiving pocket therebetween, the gate blade is provided with a groove of V-shaped cross-section in the peripheral edge face thereof and the blade is encapsulated in a layer of resilient material. With this arrangement, during closing, the resilient blade coating is pressed into leak-tight engagement with both seat members and the V-shaped groove edges scrape the seat members clean.

Thus, it will be seen that particularly when handling a highly concentrated stock, the gate valve of this invention is capable of not only providing a leak-tight seal from either direction but is also capable of removing any fibers or other solid material from the faces of the seat members as the gate comes into the engagement therewith.

IN THE DRAWINGS

FIG. 3 is an enlarged partial section showing details of a valve seat in engagement with a gate;

FIG. 4 is an enlarged partial section showing details of alternate valve seat arrangements.

Figure 1:
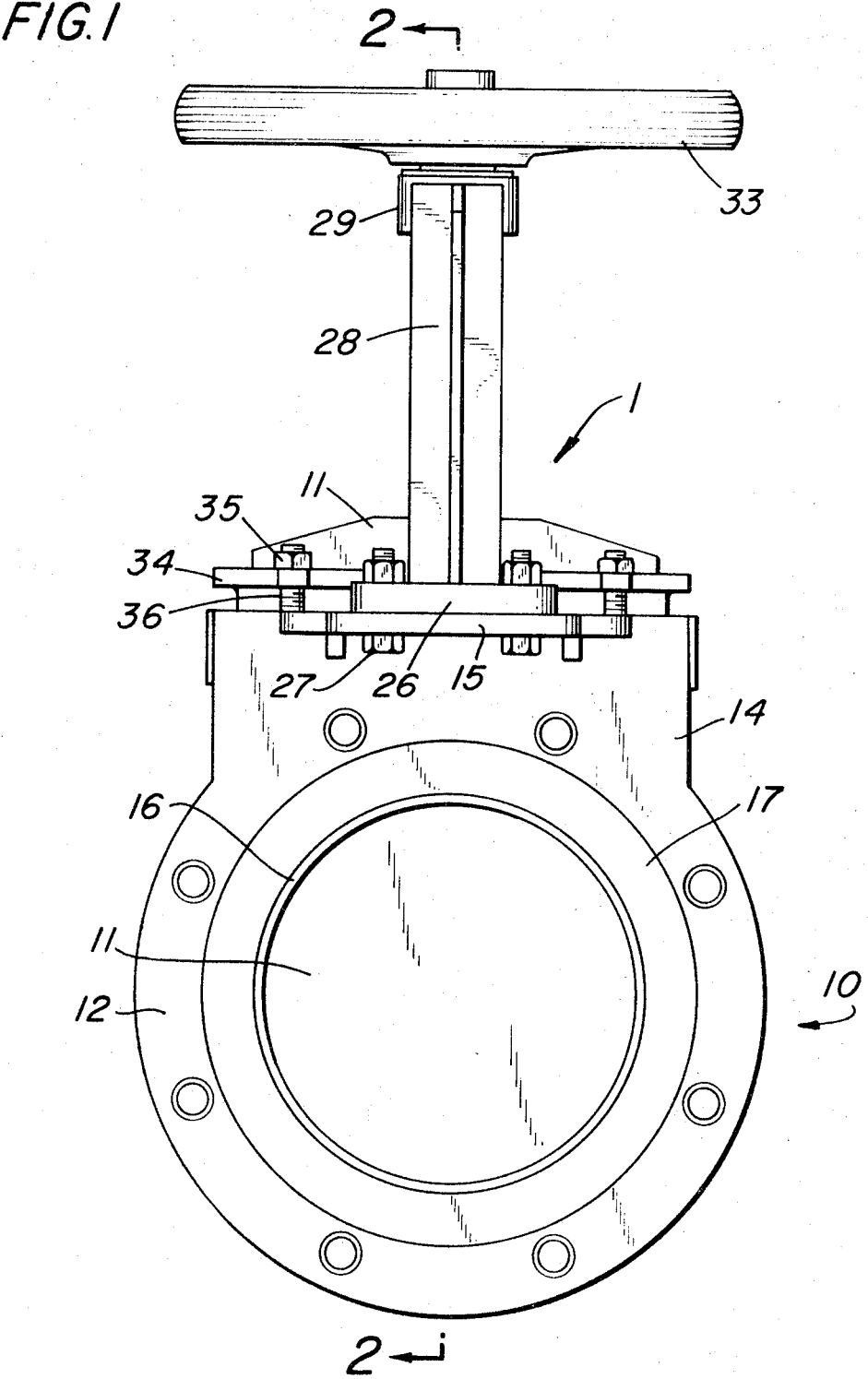
FIG. 1 is a front view of the gate valve.

As will be seen from the drawings, the gate valve, generally indicated by reference numeral 1, includes a valve body 10 and a gate blade 11 which is raised and lowered by valve stem 30 and handwheel 33. The valve body has a flow passage defined in part by a pair of aligned cylinders 16 having bolting flanges 12 welded to the outer ends thereof. A reinforcing member 13 is welded between the flanges. Machined stainless steel rings 17 are welded to the outer faces of flanges 12 surrounding cylinders 16 and are adapted to engage similar machined parts on the flanges of pipes by means of volts. The inner ends of cylinders 16 project into and are welded to the opposite end walls 22 of a valve chest.

The flanges 12 have upwardly extending rectangular portions 14 and base plates 15 are welded to the upper ends of these portions 14. Studs 36 are welded to the upper surfaces of these same portions 14. A suitable packing gland 34 fits within the end walls 22, and is retained in place by nuts 35 threaded on studs 36. The gate blade 11 travels up and down within the gland 34 and filler pieces 23 are provided within the packing box for guiding the gate blade therein.

Figure 2:
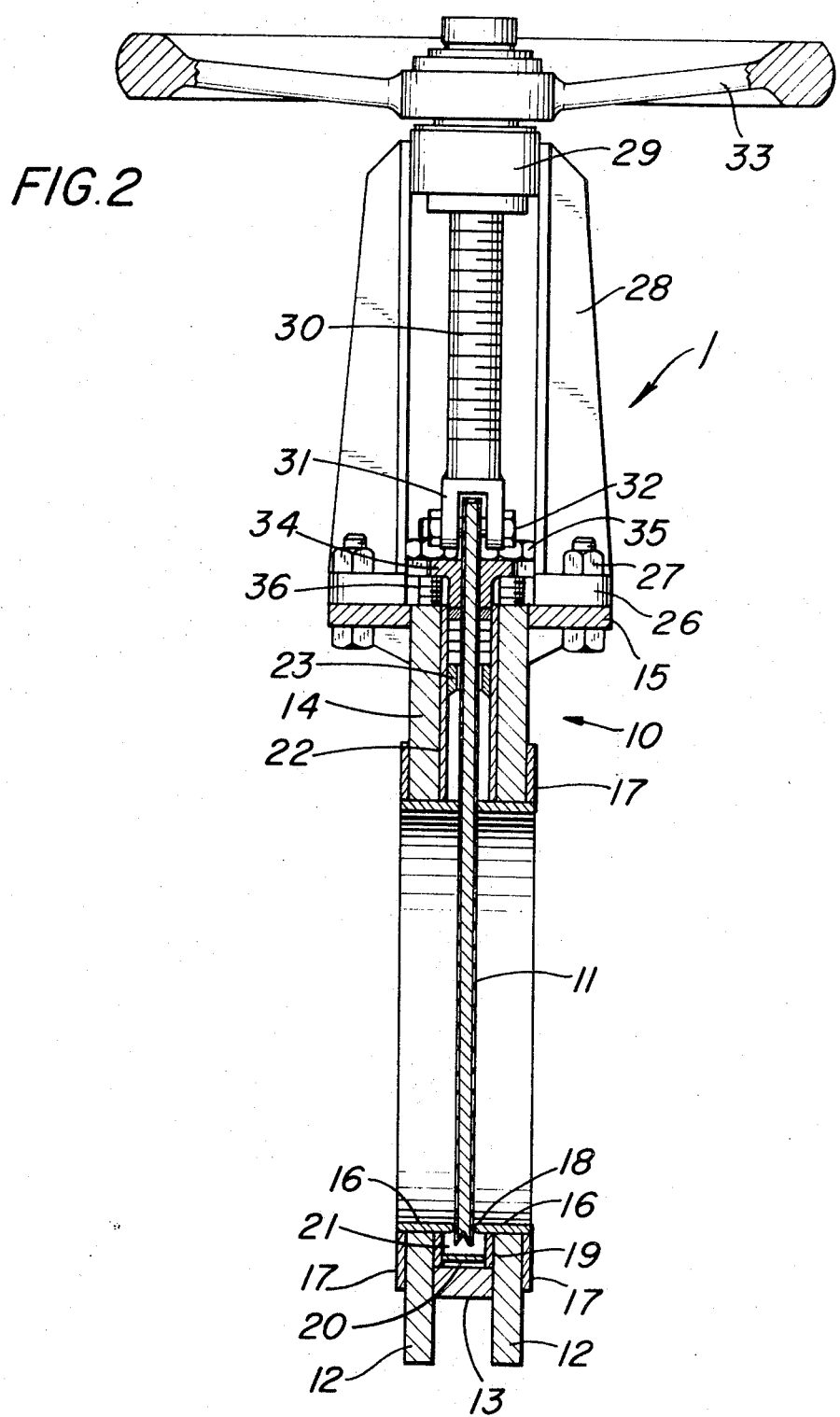
FIG. 2 is a longitudinal vertical section of the gate valve of FIG. 1 showing the valve gate in the closed position and in sealing contact with the valve seats.

Gate blade 11 is connected at its upper end by a conventional clevis arrangement 31 and bolt 32 to the lower end of stem 30, as shown in FIG. 2. This stem extends at its upper end through a conventional nut 29 which is mounted in yokes 28 and the upper end of the stem has a handwheel 33 fixed thereto. The lower ends of the yokes have plates 26 which are mounted on the base plate 15 by means of bolts and nuts 27.

The lower end of gate 11 is semicircular in shape and is some-what wider than the flow passage. To accommodate this wider gate, the flow passage is provided with a pocket 21 facing in the direction of opening movement of the blade 11. This pocket 21 is provided with stainless steel side walls 19 and a stainless steel bottom wall 20, while the inner ends of cylinders 16 project inwardly past walls 19 to form valve seats 18 which are integral with the valve body.

The entire outer surface of the valve gate 11 is covered by a coating 25 of a resilient or elastomeric material, such as rubber, neoprene, polytetrafluorethylene or high molecular weight polypropy-lene. As can best be seen from FIG. 3, the peripheral edge of the gate has a V-shaped groove 24 so as to provide relativley sharp edges 37 adjacent the valve seats 18.

FIG. 4 illustrates two alternate seat profiles which can be used. The valve seat 38 on the left has two points of contact and the valve seat 39 on the right is shown with three points of contact.

The gate 11 is arranged to fit very snugly between the valve seats 18, 38 or 39 so that a good liquid seal is provided in both flow directions. By providing the sharp edges 37, it will be seen that as the gate comes into engagement with the seats, the sharp edges scrape pulp fibers from the seat faces. Also, by providing the V-shaped groove 24 and having the seats 18, 38 or 39 project inwardly from the side walls 19 of pocket 21, the pulp fibers which are carried into the pocket 21 by the gate do not become packed into the pocket. Otherwise, with repeated closings of the gate there will be a gradual build-up of packed fibers within the pocket which will eventually interfere with the proper closing of the valve.

We claim:

1. A gate valve comprising: a valve body having inlet and outlet portions with curved walls of circular cross-section defining a flow passage, the flow passage comprising a pair of axially spaced cylindrical members with the inner end faces of said cylindrical members forming valve seats; a gate blade slot between said inlet and outlet portions; a pair of annular seat members formed integrally with the walls of the flow passage and defining a gate blade receiving pocket therebetween; a gate blade having a semicircular end projecting through the slot, said gate blade having a groove of V-shaped cross-section in the peripheral edge face thereof; said gate blade receiving pocket extending beneath the cylindrical members and wherein the inner end faces of the cylindrical members project inwardly beyond the side walls of the pocket; resilient material encapsulating said blade whereby during closing the resilient material is pressed into leak-tight engagement with both seat members, and, said V-shaped groove edges scrape the seat members clean.

2. A gate valve according to claim 1, wherein said seat members have ridges on their periphery engaging said gate blade.

* * * * *